US008300897B2

(12) United States Patent
Nagasaka et al.

(10) Patent No.: US 8,300,897 B2

(45) Date of Patent: Oct. 30, 2012

(54) PERSONAL AUTHENTICATION APPARATUS AND METHOD

(75) Inventors: Akio Nagasaka, Kokubunji (JP); Takafumi Matsumura, Hitachinaka (JP); Masahide Hayashi, Mito (JP); Takafumi Miyatake, Hachioji (JP); Naoto Miura, Kokubunji (JP); Harumi Kiyomizu, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 1058 days.

(21) Appl. No.: 12/246,550

(22) Filed: Oct. 7, 2008

(65) Prior Publication Data

US 2009/0092291 A1 Apr. 9, 2009

(30) Foreign Application Priority Data

Oct. 9, 2007 (JP) ................................ 2007-262845

(51) Int. Cl.
*G06K 9/00* (2006.01)
*G05B 19/00* (2006.01)

(52) U.S. Cl. ........................ 382/115; 382/124; 340/5.83

(58) Field of Classification Search .................. 382/115, 382/124, 224, 180, 190, 209, 132; 356/71, 356/39; 600/322, 316, 500, 547, 310, 479, 600/506; 340/5.83, 5, 53, 5.52
See application file for complete search history.

(56) References Cited

U.S. PATENT DOCUMENTS

| | | | | |
|---|---|---|---|---|
| 7,171,026 | B2 * | 1/2007 | Shinada et al. | 382/104 |
| 7,245,745 | B2 * | 7/2007 | Nagasaka et al. | 382/115 |
| 2004/0184641 | A1 | 9/2004 | Nagasaka et al. | |
| 2005/0254690 | A1 | 11/2005 | Nagasaka et al. | |
| 2006/0002592 | A1 | 1/2006 | Miura et al. | |
| 2007/0124599 | A1 * | 5/2007 | Morita et al. | 713/186 |
| 2007/0177767 | A1 | 8/2007 | Miura et al. | |
| 2008/0152195 | A1 * | 6/2008 | Nagasaka et al. | 382/115 |

FOREIGN PATENT DOCUMENTS

| | | |
|---|---|---|
| EP | 1 654 984 | 5/2006 |
| EP | 1 808 798 | 7/2007 |
| JP | 2000-315118 | 11/2000 |
| JP | 2003-085540 | 3/2003 |
| JP | 2004-265269 | 9/2004 |
| JP | 2005-071317 | 3/2005 |
| JP | 2006-051279 | 2/2006 |
| JP | 2006-99493 | 4/2006 |
| JP | 2007-206991 | 8/2007 |
| JP | 2007-236610 | 9/2007 |

* cited by examiner

*Primary Examiner* — Sheela Chawan
(74) *Attorney, Agent, or Firm* — Antonelli, Terry, Stout & Kraus, LLP.

(57) ABSTRACT

There is provided a finger-vein authentication apparatus including a light source for illuminating one surface of both side-surfaces of a fingertip of a finger with light, and an image sensor for imaging the other surface of the fingertip, the light source and the image sensor being positioned at both sides of a nail of the fingertip with the nail sandwiched therebetween, wherein a fingertip guidance jig for supporting the fingertip and a finger-root guidance jig for supporting a finger-root of the finger are disposed between the light source and the image sensor, a light-shielding unit being disposed on the light-source side, the light-shielding unit being used for shielding the illumination light such that the illumination light will not travel to a ball side of the finger.

5 Claims, 6 Drawing Sheets

PERSONAL AUTHENTICATION APPARATUS AND METHOD

INCORPORATION BY REFERENCE

The present application claims priority from Japanese application JPA-2007-262845 filed on Oct. 9, 2007, the content of which is hereby incorporated by reference into this application.

BACKGROUND OF THE INVENTION

The present invention relates to a personal authentication apparatus using a living body. More particularly, it relates to a biometric personal authentication apparatus based on the vein pattern of a finger.

In recent years, attention has been focused on biometric authentications as security schemes where carrying a key or the like is unnecessary, a high convenience is accomplished, and there is a less danger of being illegally exercised by being lost or stolen. In these biometric authentications, a part of the body of an individual person, such as fingerprint, iris, or vein pattern, is used as the key. Of these biometric authentications, in the authentication methods using the vein pattern of a finger, criminal investigation is not associated therewith, or, unlike the case of the iris, an eyeball is not directly illuminated with light. Accordingly, in the authentication methods using the finger-vein pattern, there exists an advantage of causing only a little sense of psychological resistance. Also, in the authentication methods using the finger-vein pattern, the authentication is based not on characteristics of the easily observable living-body surface, but on inner characteristics of the living body. Consequently, there also exists an advantage that there is no residual property, and that their forgery is difficult to implement.

As a conventional embodiment of the finger-vein authentications of this type, there has been known an authentication apparatus disclosed in, e.g., JP-A-2007-206991. Not being limited to this apparatus, in the finger-vein authentications, there has been known the following method: Namely, in order to image the vein pattern of a finger, the finger is illuminated with near-infrared light, then being seen through with the near-infrared light which has passed through the inside of the finger. Here, in general, hemoglobin in the blood which is flowing in the vein absorbs the near-infrared light. As a result, in the vein part, the light is weakened after transmitting there; whereas, in the other part, the light passes therethrough just as it is. Accordingly, the contrast between these lights forms the vein pattern. In particular in JP-A-2007-206991, the following scheme is disclosed: Namely, in order to image the vein pattern of the ball side of a finger, the near-infrared light is caused to enter the inside of the finger from a part of the ball side of the finger. Moreover, the vein pattern of the ball side is subjected to the transmission imaging, using the light which travels in the inside of the finger while being scattered there, and which appears onto the outside of the finger from a different part of the same ball side of the finger. The employment of this scheme allows a light source and a vein imaging camera to be united and integrated only at the finger's ball-side. As a result, an extra structure becomes unnecessary on the periphery of a part on which the finger should be placed in the authentication apparatus. Consequently, it has been found successful to implement the flat-plane-shaped and space-saving authentication apparatus.

Also, in JP-A-2004-265269, the disclosure has been made concerning the small-size implementation of a part in which the user is engaged at the time of the authentication, such as an open-type apparatus where light sources are positioned on both side-surfaces of the finger.

SUMMARY OF THE INVENTION

In the finger-vein authentications, utilization value as alternatives to keys exists in a variety of aspects where the keys and locks have been employed up to the present. This utilization value as the alternatives to the keys is to be able to accomplish such purposes as a reinforcement in the security and an enhancement in the convenience resulting from a high operability of merely holding a finger over the authentication apparatuses. Depending on the products into which the finger-vein authentications are to be installed, however, many of the products find it difficult to ensure their adequate set-up locations. Accordingly, small-size implementation of the authentication apparatuses becomes important. In the authentication apparatus disclosed in JP-A-2007-206991, eliminating a protrusion onto the rear side of the finger is made possible by uniting and integrating the light source and the vein imaging camera onto the ball side of the finger. No sufficient consideration, however, has been given to a factor of reducing thickness of the entire apparatus configured by such components as the light source and camera gathered to the finger's ball-side. Also, in JP-A-2004-265269 described above, the consideration has been given to the small-size implementation of the part which concerns the user at the time of the authentication, such as an open-type apparatus where the light sources are positioned on both side-surfaces of the finger. No study, however, has been made to thin-type and small-size implementation of the entire apparatus.

Furthermore, in the above-described schemes, the disclosures have been made concerning the configurations where priority is given to the small-size implementation and the enhancement of the convenience. Namely, a light-source placement which is optimum for the clear vein-pattern imaging is not necessarily employed. Accordingly, it cannot be said that sufficient consideration has been given to the imaging quality.

For example, in the structure disclosed in JP-A-2007-206991 where the finger's imaging target part and the light-incoming part are on the same plane, the intensity of light at the light-incoming part needs to be enhanced. This light-intensity enhancement is needed in order to deliver the light to the target part with intensity sufficiently high to permit the vein to be reflected on the imaging plane. On account of this enhancement of light, it leaks out of a part of the finger which is positioned halfway until the light reaches the imaging plane. Moreover, this light which has leaked out becomes external light with respect to the imaging plane. Namely, the surface of the imaging plane is illuminated with this external light. As a result, this external light has become a factor of degrading the vein imaging quality. In addition to this, when priority is given to the further small-size implementation to narrow the target range of the finger's imaging, information amount on the vein pattern used for the authentication is lowered. Consequently, there has existed a concern of exerting a bad influence on the authentication accuracy as well.

In view of this situation, an object of the present invention is to provide a well-balanced finger-vein authentication apparatus which is capable of accomplishing not only the small-size and thin-type implementation thereof, but also a little deterioration in the authentication accuracy. Also, a second object of the present invention is to provide application functions which are capable of having a high convenience and serving for a security enhancement as well.

In order to accomplish these objects, in the present invention, there is provided a finger-vein authentication apparatus including a light source for illuminating, one of both side-surfaces of a fingertip of a finger, and an image sensor for imaging the other surface of the fingertip, the light source and the image sensor being positioned at the both sides of a nail of the fingertip with the nail sandwiched therebetween, wherein a fingertip guidance jig for supporting the fingertip and a finger-root guidance jig for supporting a finger-root of the finger are set up between the light source and the image sensor, a light-shielding unit being set up on the light-source side, the light-shielding unit being used for shielding the illumination light such that the illumination light will not diffract onto a ball side of the finger, an empty clearance being provided at a position under a half plane of the finger's ball side on the imaging side.

According to the present invention, it becomes possible to implement the high-convenience authentication apparatus where the finger's rear-surface side is opened, and although formed into the thin-type authentication apparatus, to implement a clear vein imaging via a light illumination from the opposite surface side against the imaging target plane. Also, the empty clearance is provided at only the position under the half lower plane of the finger on the imaging-plane side. This empty clearance makes it possible to avoid a crushing of the vein pattern due to a pressure applied onto the imaging plane by touching the structure with the finger. Also, the light-shielding unit set up on the light-source side makes it possible to suppress the diffraction of light from the light-source side.

Other objects, features and advantages of the invention will become apparent from the following description of the embodiments of the invention taken in conjunction with the accompanying drawings.

DETAILED DESCRIPTION OF THE INVENTION

Hereinafter, the explanation will be given below concerning embodiments of the present invention.

Figure 1:
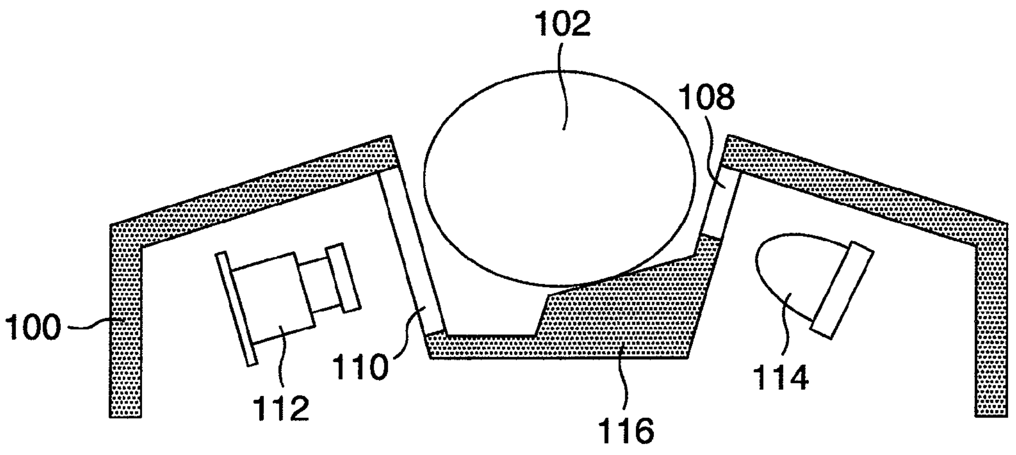
FIG. 1 is an example of the apparatus embodiment which implements the present invention.

FIG. 1 is a schematic diagram of the authentication apparatus according to a first embodiment of the present invention. A housing 100 includes a groove-shaped structure therein. By this groove, a location on which a finger is to be placed is presented in a manner of being readily recognizable intuitively. A light source 114 is disposed on one of the right and left sides of the groove. An image sensor (i.e., camera) 112 is disposed on the other side thereof in a manner of being opposed to the light source 114. If the present authentication apparatus is set up at a location which is difficult to recognize visually from the user, this groove plays a role of a three-dimensional guiding mechanism for permitting the user to gropingly confirm the location on which the finger is to be placed. Simultaneously, this groove also has a function as a light-shielding side wall which is low in such an extent that a half plane of the lower portion of the finger is concealed when the finger is placed thereon. Accordingly, this groove is capable of physically shielding external light which enters in from the low position. The light source 114 is set up inside the apparatus, and its upper surface is covered. The finger placed on the groove is illuminated with the light via a light-source aperture part 108. The cover on the upper surface of the light source 114 also plays a role of preventing light, which diffuses to outside the desired illumination direction and is reflected by fingers other than the authentication finger and by the palm, and thus exerting influences on the imaging as an external stray light. When, in alignment with the groove, the authentication finger is placed on the groove in such a manner that the ball side of the finger is directed to the bottom-surface side of the groove, and the rear side of the finger is directed to the opened side of the groove, this groove plays a role of guiding the fingertip in such a manner that the position of the fingertip will not be significantly shifted on each trial of the placement. This is because of a half-circle-shaped depression 104 which is provided in the groove such that it is fitted to configuration of the ball side of the fingertip. If this shift becomes larger, the range of the vein to be imaged is also shifted in conjunction therewith, and thus a change in the vein pattern becomes larger, which makes it rather difficult to judge it being an identical finger even if so.

Meanwhile, on the side in proximity to a finger-root side, a half-circle-shaped finger guidance jig 106 is provided. This finger guidance jig 106 has a function of guiding the finger such that, similar to the half-circle-shaped depression 104, the position and inclination of the finger will become stabilized on each trial of the placement. This is achieved by taking advantage of the fact that, when the finger is placed on the half circle, the finger is most likely to be stabilized at the lowest position thereof. Also, a button switch 118 can also be provided in the depression 104. Pressing the switch 118 allows the user to initiatively instruct the authentication itself, or a timing for exercising some other control together with the authentication. Also, an imaging aperture part 110 is positioned such that the part 110 faces mainly a part of the finger ranging from the fingertip to a first joint of the finger. Accordingly, this position allows the finger to be imaged from the camera 112 which is positioned behind the part 110.

This camera may be a common camera where an image device such as CCD and lenses are integrated, or may be a thin flat-panel sensor. When the flat-panel sensor is used, au upper surface cover covering the camera 112 may be of a thickness which is so thick as to contain only the flat-panel sensor. This thickness makes it possible to implement a conformation like only the imaging aperture part 110 stands just like a wall having a thickness equivalent to that of the flat-panel sensor. If, as the light source, a thin-type light source such as LED is employed similarly, the groove as the finger-placing guide is formed in a manner just like being sandwiched between the thin walls. In this case, in particular, when using a fingertip of the middle finger for the authentication, fingertips of the three fingers, i.e., index finger, middle finger, and ring finger, can be placed in a manner of being neatly arranged naturally without opening them forcibly. This makes it possible to prevent the finger to be rotated around the long-axis direction, thereby allowing implementation of the stable authentication. As described earlier, however, in the present invention where only the front-end portion up to the first joint of the finger is used for the authentication, arranging the three fingers neatly is easy with the covers sandwiched therebetween, even if the covers covering the camera and the light source are somewhat large. In the conventional scheme where the area up to the finger-root is employed as the authentication target area, a structure is employed where the finger is movable with its root as the central point. As a result, the mutually adjacent fingers are more proximate to each other as the positions come nearer to their roots. Accordingly, if the cover is large, the cover becomes an obstacle thereto at their root parts. Consequently, arranging the three fingers neatly becomes exceedingly difficult.

Here, in the present drawing, the imaging aperture part 110 is drawn such that the part 110 opens from a location closer to the finger-root side than the fingertip guidance jig 104. The position and width of the part 110, however, is not particularly limited thereto. Conversely, it is advantageous to set the position and width such that the largest possible range will be able to be imaged with respect to the long-axis direction of the finger, e.g., the vein pattern can be acquired in the widest possible range. In particular, if it is possible to acquire the area up to the fingertip as an image without fail, a unique determination of the image target area becomes easy by using the relative position information from the front-end position of the finger. This makes it possible to make a contribution to the enhancement in the authentication accuracy. In this case, however, the depression 104 in the fingertip guidance jig causes a problem from the imaging point-of-view in some cases. That is, when the fingertip is imaged from the camera side, a part of the finger contained in the depression 104 cannot be seen, since the part comes into the shade of a circumferential part which surrounds the depression 104. On account of this, whereas there appears a side effect that the depth of the depression becomes shallower on the camera side and that the effect of guiding the fingertip into the specified position is lowered, a devise may be made in which the circumferential part is lowered, and the reduction in the image-failed area of the fingertip is made as small as possible.

Meanwhile, a filter for permitting only the near-infrared region wavelength to pass therethrough is attached on the camera 112. This filter suppresses the influence of the visual-region light on the photographed image, thereby imaging the blood-vessel vein pattern clearly. A light-shielding partition wall 116 is provided in order to prevent the light from the light source 114 from leaking out toward the camera 112. Both the imaging aperture part 110 and the light-source aperture part 108 are covered with a glass or acryl plate. The glass or acryl plate, which is transparent to the wavelength region of the light source, permits the light to pass therethrough, and also prevents foreign substances from entering inside of the authentication apparatus. Instead of the above-described glass or acryl plate, the employment of an optical filter plate for permitting only the near-infrared region light to pass therethrough makes it possible to consolidate the two functions, i.e., the apparatus protection and visual-region light elimination, into the one piece of plate. This optical filter plate cuts off the visual-region light, thereby allowing accomplishment of an artistic consideration of making the inner components such as the light source 114 invisible. Moreover, the housing 100 including the light-source aperture part 108 and the imaging aperture part 110 may be integrally formed with the optical filter material.

The explanation of FIG. 1 based on its cross-sectional diagram is as follows: In order to image the target range of the finger's imaging, or the entire finger including it, as widely as possible, the imaging aperture part 110 is set to be a little larger as compared with the light-source aperture part 108. An empty space is provided on the under side of the finger's imaging surface. This empty space prevents the vein from being pressed when the lower part the finger comes into contact with a part of the apparatus housing, thereby preventing the vein pattern from being modified or from getting poor reception. On the other hand, on the surface opposite to the finger's imaging surface, i.e., on the surface on the light-source side, the bottom surface 116 (i.e., the light-shielding partition wall 116) of the housing 1 is arranged in a manner of being proximate to the lower part of the finger. Also, the light-source aperture part 108 is provided in a manner that it becomes a little smaller, or in particular, a little shorter in the height direction at a higher position nearer to the rear side of the finger. Consequently, the part 108 also plays a role of a light-shielding unit for controlling the light so that the light is illuminated intensively to the part close to the rear side of the finger, and so that, conversely, the light will not travel onto the ball side of the finger. The light emitted from the light-source aperture part 108 travels onto the ball side of the finger in such a manner that part of the light is reflected by the surface of the finger and is reflected further by the wall surface of the housing. This light straying in this way is suppressed by the bottom surface 116. This suppression can be made more effective by applying processings such as light-absorbing coating, using light-absorbing material, and light-absorbing processing to the housing constituting components ranging from 108 to 116, and thereby preventing the light from traveling onto the ball side of the finger. Also, the bottom surface 116 is formed into a configuration of ascending from the center of the finger-placed groove toward the light-source aperture part 108 in alignment with a curved surface of the cross section of the finger. The employment of this configuration makes it possible to suppress the reflected light from traveling linearly, and from arriving at the camera side as intense light. Providing the bottom surface 116 with the light-absorbing effect also makes it possible to expect that the reflected light will attenuate while traveling by repeated reflections a large number of times. Incidentally, at this time, the finger itself is guided by the fingertip guidance jigs 104 and 106 into a state of floating from the bottom surface 116. This floating state suppresses a contact area between the finger and the housing down to minimum, thereby making it possible to address anxiety of the user to a sanitation aspect or the like.

Also, a display device such as liquid-crystal panel can be disposed at the bottom surface between the light-source aperture part 108 and the imaging aperture part 110 including the bottom surface 116. This allows implementation of display of message, illustration, and image for informing how to place the finger and the finger position. On the display device, usually, information such as point-in-time not related with the authentication can be displayed. At the time of authentication, the displayed contents are changed, and the display device becomes the finger-guiding guide. If the illustration and image indicate the position and direction of the finger just the way they are, implementation of the authentication at the correct position becomes possible only by superposing the finger on the illustration and image just as being indicated thereby, which is advantageous in the aspect of operability as well. After the finger has been placed thereon correctly, the display is not needed any more, and consideration is given so that the authentication will not be hindered by extinguishing the liquid crystal itself and its displaying light source such as backlight, if any. Otherwise, the backlight may be made usable for the authentication by employing the near-infrared region light for the backlight.

In the configuration illustrated in FIG. 1, the camera 112 is disposed obliquely, thereby imaging a range from the side surface of the finger to a position somewhat nearer to the ball side thereof, which allows the thin-type implementation of the authentication apparatus. When imaging only the side surface of the finger by simply disposing the camera horizontally, the camera is arranged beside the finger just as it is disposed. As a result, it turns out that, beside the finger, there exists a highly-protruded configuration component which has a width of the camera's size and an optical-path length needed for the imaging. Although the use of a small-sized camera or flat-plane-type sensor may reconcile this problem of the width, the situation remains unchanged in the height direction. Accordingly, this highly-protruded configuration component brings a feeling of oppression to the user, and also, at the set-up, this component becomes difficult to settle within a narrow space due to the problem of its height.

Disposing the camera 112 obliquely as is illustrated in FIG. 1 makes it possible to tremendously suppress the height of the camera 112 which is protruded to the lateral side of the finger, although the set-up space for the camera becomes necessary at the position under the finger as compared with the case where the camera is disposed directly beside the finger. For the purpose of the authentication operation, the part under the finger is not necessarily required to appear outside. Consequently, the set-up space itself for the outside-appearing part can be suppressed by embedding the part into the inside of the fixing place. Also, the oblique deployment of the camera allows the thickness of the embedded part to be suppressed smaller as compared with the case where the camera as a whole is disposed at the position under the finger like the method disclosed in JP-A-2004-265269 mentioned earlier. In this way, in the oblique deployment of the camera, the outside-appearing part and the embedded part share their own set-up spaces in small amounts, respectively. As a result, either of these parts has a bigger burden and the limited space becomes available in a good balance. This oblique-deployment method is also applicable to the light source 114 similarly. For the entire apparatus, it is preferable to arrange the camera, the finger, and the light source such that the line connecting them to each other configures a character of "Λ".

In this case, on the other hand, there exists a problem that the camera, the finger, and the light source do not arrange in a straight line. In executing the imaging of the vein pattern, the clearest imaging quality can be obtained in the case where the camera and the light source are facing opposite to each other with the finger sandwiched therebetween. The reason for this is as follows: When the light comes from just behind the imaging target surface, the transmission light which projects the vein pattern can be made sufficiently intense while the too intense direct light from the light source is being concealed most appropriately by the finger itself. When the light-source position is shifted, the thickness of the side surface of the finger becomes thinner, since the cross section of the finger is approximately elliptic. As a result, the intensity of light becomes exceedingly high in the case where the light source can be seen through the thinner location. Also, as the position of the light source shifts nearer to the end, the diffraction of light to the nearer side becomes larger. Accordingly, it is preferable to make an adjustment so that the light will be most concentrated on an extension line between the camera and the finger by converging the light from the light source with a lens or the like. Also, as described earlier, it is of particular importance by devising the configuration of the bottom surface 116 to implement a structure capable of light-shielding for preventing the intense light from the light source from diffracting to the ball side of the finger.

Figure 2:
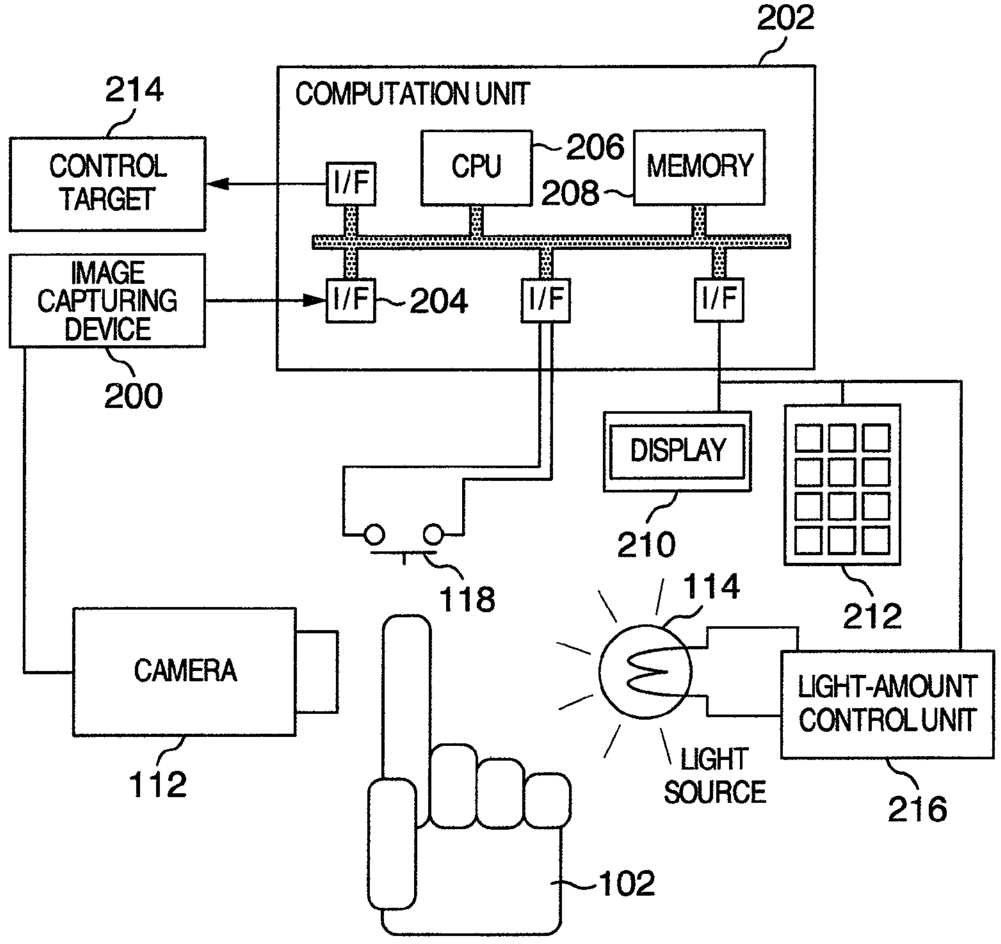
FIG. 2 is an example of the apparatus system configuration which implements the present invention.

FIG. 2 is an example of a schematic block diagram of the system configuration which embodies the present invention. A power-supply of the system is switched on, then insetting the finger 102 between the light source 114 and the camera 112. In accordance with this procedure, an image signal of the vein pattern is acquired. The image signal acquired by the camera 112 is converted into digital data by an image capturing device 200, then being stored into a memory 208 via an input/output interface 204 of a computer 202. A switch 118 is similarly connected to the computer 202 via the input/output interface 204, thereby notifying a CPU 206 of an ON/OFF state of the switch 118. The CPU 206 detects the finger by periodically processing images from the camera 112. After the detection, the CPU 206 determines the sensitivity of the camera 112 and optimum light amount for the light source 114, then controlling a light-amount control unit 216 in accordance therewith. At the point-in-time when the optimum imaging quality is obtained, the CPU 206 extracts the vein pattern, then making the comparison between the vein pattern extracted and vein patterns which have been similarly extracted in advance and registered. Moreover, based on the comparison result, the CPU 206 displays the comparison result on a display device 210, or transmits appropriate signals to a control target 214 to exercise respective types of controls such as open/close of a door. In addition to these processings, the CPU 206 is capable of performing a variety of processings in correspondence with the comparison result between the vein pattern imaged by the imaging unit and the registration patterns. A keyboard 212 is usable for inputting supplemental information about the authentication, such as, e.g., personal identification number. Depending on the requirements, it is of course possible to connect and utilize an external information appliance such as an IC card.

Figure 3:
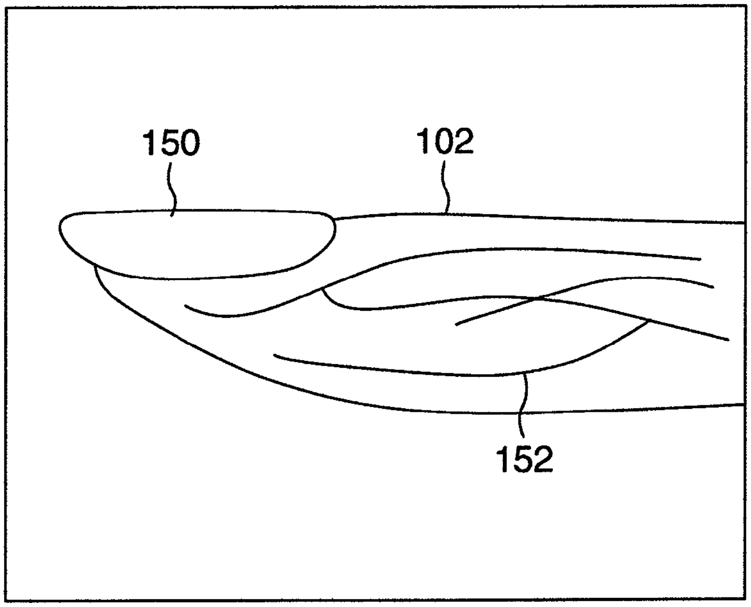
FIG. 3 is an example of the image photographed in the apparatus embodiment of the present invention.

FIG. 3 is a schematic diagram for illustrating an example of the vein image of the finger imaged by the camera 112. In the present invention, it is preferable to select, as the target area of finger's imaging, a range of about 2 cm to 3 cm long whose center is at the area ranging from the fingertip to the first joint of the finger. In the conventional finger-vein authentications, almost the entire area of the finger has been used. In this conventional scheme, however, there exists a limit to the small-size implementation in the apparatus size. Also, merely narrowing the target area to only a part of the finger makes an individual difference in the vein pattern unclear, thereby resulting in a possibility of lowering the accuracy. As the security technology, it is desirable to accomplish the small-size implementation without lowering the accuracy. Here, the fingertip is an area where blood vessels and nerves are densely collected, and thanks to this fingertip's feature, humans find it possible to do fine and complicated tasks using the fingertip. On account of this, as the area comes nearer to the fingertip, a pattern constituted by a plurality of densely veins is likely to become complicated. In particular, for the side surface of the fingertip, the veins can easily be seen through, and accordingly the clear vein pattern is easy to acquire. This is because the side surface of the fingertip is not covered by the nail unlike the rear side thereof, and has a thinner skin as compared with the ball side thereof. It can be considered that a vein pattern which is imaged by magnifying only this near-fingertip side-surface part to an image size which is basically the same as the conventional schemes where the entire area of the finger is imaged provides with features having sufficient characteristics to discriminate each individual person. However, many of the dense veins of the fingertip, are exceedingly thin veins. Such exceedingly thin veins are likely to vary due to a change in temperature and the physical condition. On account of this, when imaging the finger, the imaging is performed with a definition degree or clearness degree of an extent which allows the imaging of only veins having enough thickness with no danger of exhibiting such a variation. Otherwise, if the thin veins never fail to be imaged, the thin veins are eliminated by, e.g., carrying out a smoothing to the acquired image with a smoothing filter. In this way, only the stable veins are used selectively.

When the side surface of the fingertip is used as the authentication target area, just as illustrated in the schematic diagram in FIG. 3, the curved side surface of a nail 150 is projected on the photographed image. Otherwise, even if the imaging angle of the camera is artificially set so that the side surface of the nail will be projected, no problem occurs in the authentication. At this time, in the scheme, just like the present invention, where the imaging is performed by causing the light to pass through from the side surface of the finger, the existence of the nail can easily be detected. The reason for this is as follows: The nail part is easier to permit light to pass therethrough as compared with the other biometric tissues of the finger. Accordingly, providing light whose intensity is intense enough to permit the vein pattern to be seen through results in an especially bright projection of the nail, and the nail can easily be detected. The relationship between the position of the nail and the vein pattern can be information capable of further characterizing each individual person. On account of this, if the comparison is made under a condition that not only the vein patterns coincide with each other, but also the relative position relationships between the vein pattern and the position/configuration of the nail and the configuration of contour of the nail coincide with each other, the identification accuracy of each individual person can be further enhanced. Also, the nail is relatively harder among the biometric tissues, and exhibits less modification, so that how the nail is reflected on the image becomes a preferable judgment material for estimating the direction and rotation of the finger. For example, if no nail is reflected, it can be estimated that the finger is placed such that the nail is directed to the light-source side. If, conversely, the area on which the nail is reflected is large, it can be predicted that the finger is placed such that the nail is directed to the camera side. In this case, since the vein patterns acquired are mutually different from each other significantly, it turns out that the coincidence judgment cannot be made despite of the identical finger. Accordingly, how the finger is placed is judged by how the nail is reflected, and an instruction of replacing the finger correctly is issued. Otherwise, the comparison is made after a correction is made, if the correction is made possible by a modification or conversion of the acquired image or the like. This allows an enhancement in the authentication accuracy.

The method of the discrimination of the nail is performed, for example, as in the following steps: First, the contour of the nail is determined. As a method for determining the contour, the various commonly-known methods in the image processing are available, such as the method of connecting the edges by tracing them. With respect to the contour determined, attention is focused on the contour line traveling across the rear side of the finger, and then, it is checked whether or not, a bright region is present on the fingertip side whose luminance is higher than a constant value and which expands continuously. If the bright region is present, the area of the region is determined, and then, if the area is found to be larger than a predetermined threshold value, it can be judged that the nail is present.

Subsequently, the state of how the finger is placed is judged from the nail region determined as described above. This judgment is made, for example, as in the following ways: A first method is that the state of the finger is judged to be normal if the area of the nail or an area ratio of the nail occupying the front-end part of the nail falls within a constant range, judged to be rotated onto the light-source side if the area or the area ratio is smaller than the constant range, and judged to be rotated onto the camera side if the area or the area ratio is larger than that. The other method therefore is as follows: the nail area determined at the time of the registration of the vein pattern is recorded together with the vein pattern, and then, at the authentication processing, it is judged that the finger is placed correctly if the nail area similarly detected exhibits an error within a predetermined range with the nail area at the registration. With respect to the latter method, a feature point, not being limited to the area, may be used which is derived from a characteristic configuration of a part or the whole of the contour of the nail region. Especially, this feature point is, e.g., a part at which the contour is curved steeply, or a part at which the contour becomes a protrusion. If the position of this feature point coincides with the relative position with the vein pattern at the time of the registration, it can be judged that the vein pattern acquired based on the correct manner of the finger's placement coincides therewith correctly. If, conversely, the vein pattern differs therefrom significantly, there is a possibility that the vein pattern acquired based on a wrong manner of the finger's placement accidentally coincides with the registration pattern. This leads to an authentication mistake, and the coincidence is not regarded as being established. Incidentally, the feature point may similarly be derived from a characteristic interface configuration between the nail region and a region adjacent thereto.

Figure 4:
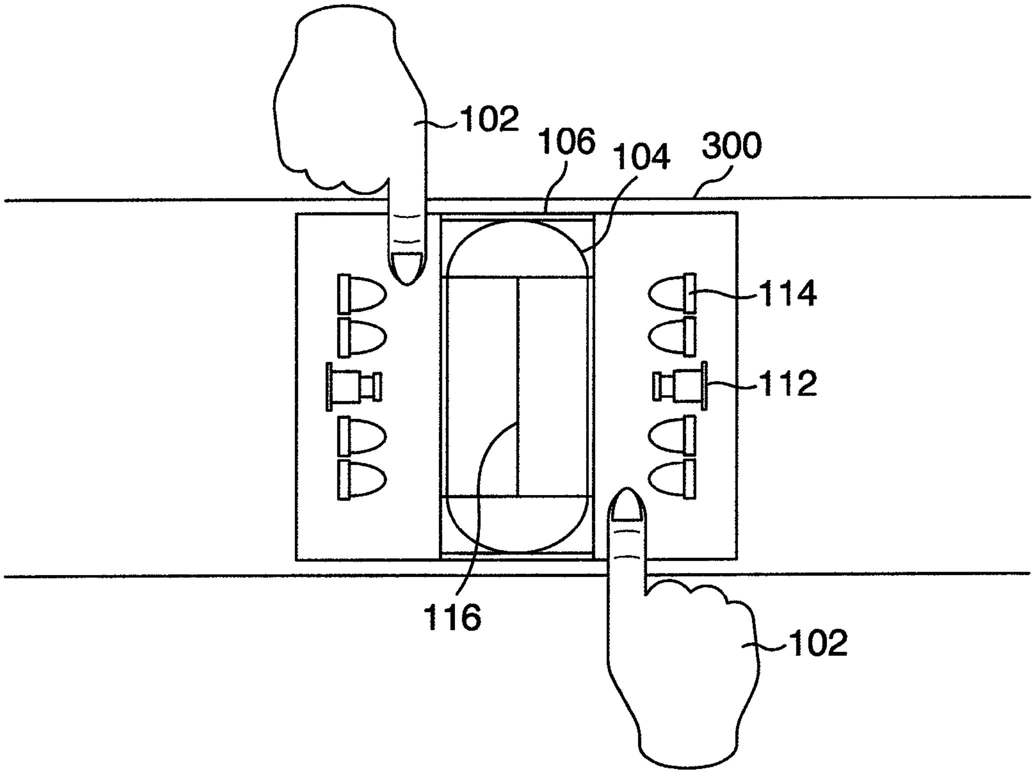
FIG. 4 is an example of the second apparatus embodiment which implements the present invention.
Figure 5:
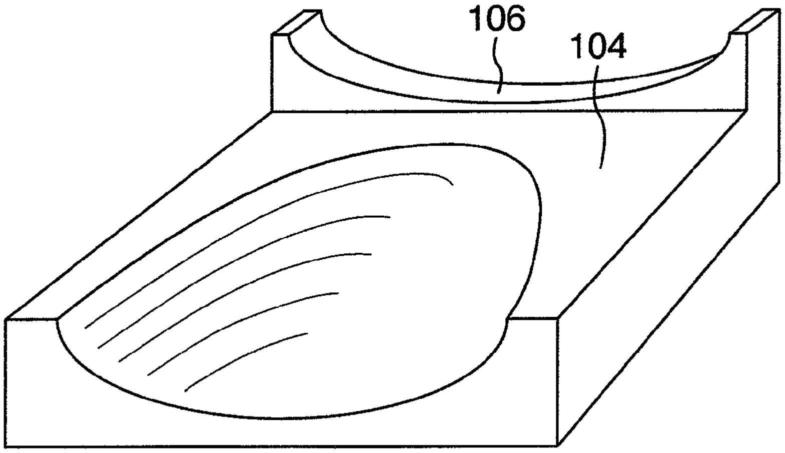
FIG. 5 is an example of a finger guidance jig of the second apparatus embodiment which implements the present invention.

FIG. 4 is a schematic diagram for illustrating another embodiment of the authentication apparatus according to the present invention. The significant difference between the present authentication apparatus and the one illustrated in FIG. 1 is a point that two sets of the fingertip guidance jig 104 and the finger-root guidance jig 106 are provided in mutually opposite directions to each other. Specifically, the two jigs, each of which is illustrated in FIG. 5, are disposed in a manner of being opposed to each other with a spacing placed therebetween. These two jigs support the finger in such a manner that a bridge is constructed between both ends. More concretely, when one of these jigs is used for the fingertip, the fingertip is supported by the depression of the fingertip guidance jig 104, and the finger-root is supported by the other jig, i.e., the finger-root guidance jig 106. On account of this, both manners of the finger's placement, i.e., the manner of the finger's placement where, in the drawing, the upper side is for the fingertip and the lower side is for the finger-root and the manner of the finger's placement where the lower side is for the fingertip and the upper side is for the finger-root, will be guided into the stable and constant position. Since the jig 106 is at the higher position, the finger assumes a mode of dropping into an obliquely-downward direction toward the fingertip. In this case, the jig for the fingertip takes a depression configuration, so that, even if the height of the jig 106 is set to be somewhat a little lower, the same jig 104 is depressed and suppresses the height. As a result, it does not occurs that the ball side of the finger comes into contact with a part of the jig 104 thereby to increase a location with which the finger comes into contact. Meanwhile, when a person with a long nail uses the authentication apparatus, the height of the jig 106 is set to be not so high that the nail will be able to escape by passing over the jig 106.

The authentication apparatus in the present embodiment is particularly preferable for a case where the apparatus is used by being set up onto a door which is closed/opened using a holding handle 300. This holding handle 300 allows the finger to be guided into the respective constant positions regardless of whether the holding handle is held by the hand from above or under. This means that, if the user changes the way of holding the holding handle depending on his or her mood at that time, addressing the changed situation flexibly is made possible. In particular, when the authentication apparatus in the present embodiment is set up in an empty clearance between holding handle 300 and the door, the authentication apparatus is difficult to see from the user. Consequently, in the stable authentication, it is important to permit the finger to be guided into the predetermined position in a groping manner by taking advantage of the guidance jigs. Incidentally, the direction of the holding handle 300 is not limited to the transverse placement, but may also be placed longitudinally. In this case, it becomes a further advantage to be able to guide the finger into the constant position similarly regardless of whether the holding handle is held by the right hand or the left hand.

The schematic diagram illustrated in FIG. 4 indicates the example where the light source and the camera are disposed on both sides of the authentication apparatus. When using the vein patterns of the side surfaces of a finger, if the camera is disposed on only one of the side surfaces, the surfaces to be imaged become different from each other between the case where the finger is placed from above and the case where the finger is placed from below. In view of this situation, the camera and the light source are paired with each other, thereby providing two sets of the cameras and the light sources, and thus making it possible to image both of the side surfaces. At this time, if both of the light sources are turned on simultaneously, light which was illuminated from one of the light sources and has passed through the finger is overlapped by light which was illuminated from the other light source and has been reflected by the finger. As a result, a successful imaging of the vein pattern becomes difficult to accomplish. On account of this, when imaging one of the side surfaces of the finger, the camera disposed on one of the side surfaces and the light source disposed on the opposite side surface of the finger are paired with each other, then acquiring the image of the vein pattern. At the time of the authentication, the above-described two sets of the cameras and the light sources are used in a manner of being switched alternately. Namely, when the light source of one set is turned on, the light source of the other set is extinguished. This operation is repeated continuously, thereby acquiring the vein patterns of both side-surfaces of the finger at the time when the finger is placed. Then, a comparison is made between these two-surface vein patterns and the vein patterns registered in advance. The number of the registered vein patterns may be of either the one-surface vein pattern or the two-surface vein patterns on each-finger basis. Even in the case of the one-surface vein pattern, it can be judged that the finger is exactly the finger of the very person registered, as long as the one-surface vein pattern coincides with one of the two both-surface vein patterns acquired at the time of the authentication. This allows authentication in both of the case where the finger is placed from above and the case where the finger is placed from below. When the number of the registered vein patterns is of the two-surface vein patterns, it is decided that the finger can be regarded as the finger of the very person registered, if either of the two-surface vein patterns acquired at the time of the authentication coincides with either of the registered two-surface vein patterns. As a result of this decision on the judgment criterion, the finger can correctly be judged to be the finger of the very person registered, even if there exists some extent of variation such as a change in the imaging condition or an injury of one surface of the finger. On the other hand, consideration is given to the following two conditions: One of the two-surface vein patterns at the authentication coincides with either of the two-surface vein patterns at the registration, and the other vein pattern at the authentication coincides with, the other vein pattern at the registration which is different from the coincided vein pattern. If the simultaneous establishment of these two conditions is selected as the judgment condition, it becomes possible to lower a probability of mistaking other person as the registered person and accepting the other person, because a probability that the vein patterns of both surfaces of different fingers coincide with each other becomes tremendously low from the probabilistic point-of-view. Incidentally, the constant position into which the finger is guided by the guidance jigs and the imaging angle of the camera are adjusted, thereby causing the imaging target area of the vein common to the two manners of the finger's placement, in order to implement a situation that, as described above, regardless of the fact that the vein patterns are imaged by whichever of the two cameras, the comparison between the patterns is allowed to be made quite similarly.

Figure 6:
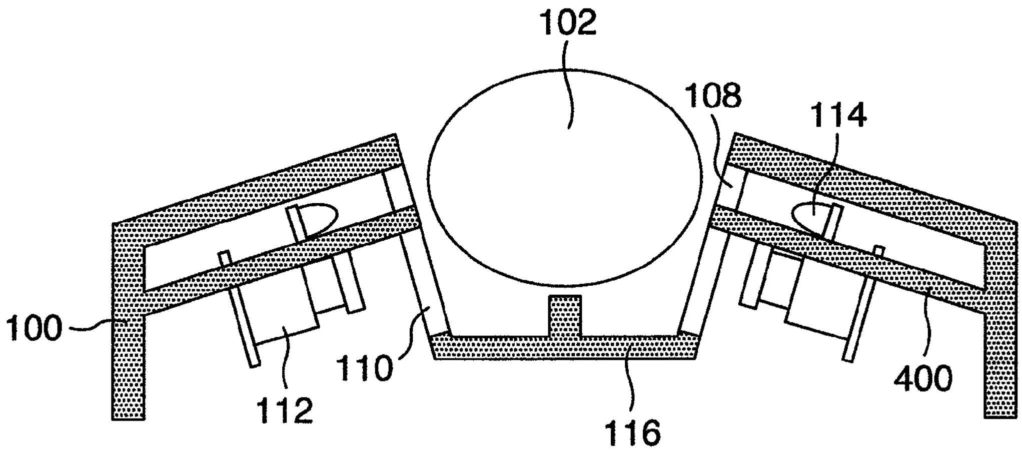
FIG. 6 is an example of the cross-sectional diagram of the apparatus embodiment illustrated in FIG. 4.
Figure 7:
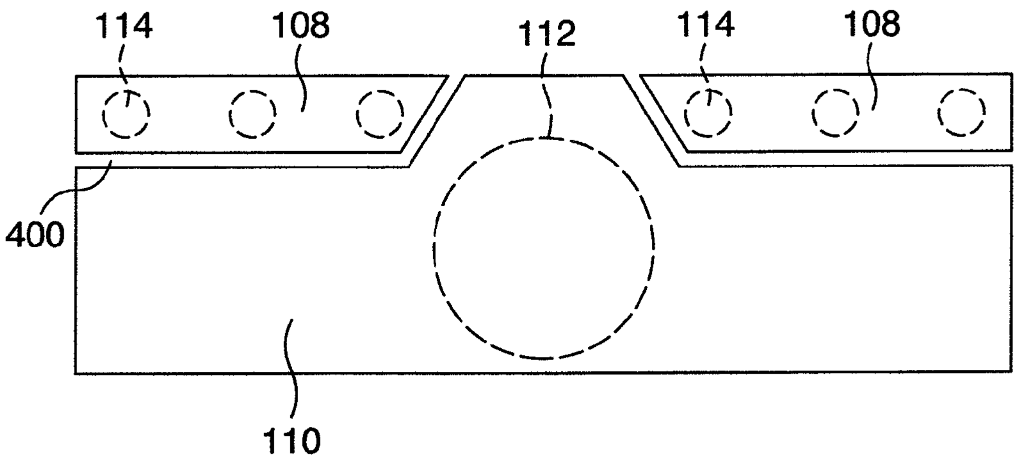
FIG. 7 is an example of the placement of an aperture part in the apparatus embodiment illustrated in FIG. 4.

Also, if the configuration of the bottom surface 116, which is positioned under the ball side when the finger is placed, is biased into only one direction as is illustrated in FIG. 1, the sets of the cameras and the light sources have no symmetry to each other, and thus the vein patterns imaged have no compatibility with each other. Accordingly, as is illustrated in FIG. 6, the configuration of the bottom surface 116 is formed into a bilaterally-symmetric configuration where only its central part stands like a wall for light-shielding. Also, making the imaging aperture part 110 larger and making the light-source aperture part 108 smaller allows implementation of an enhancement in the imaging quality of the vein patterns. Consequently, as illustrated in FIG. 7, the imaging aperture part 110 and the light-source aperture part 108 are partitioned by a light-shielding plate 400. Moreover, the light-source aperture part 108 is positioned on the upper side so that only the finger's rear side is easy to illuminate as much as possible. Simultaneously, in a part close to the center of the camera, the imaging aperture part 110 is made larger up to the upper side so that the range of the finger to be imaged by the camera can be ensured up to the rear side without fail. This configuration brings about a configuration that the light source is not positioned in the part where the camera exists, thereby resulting in a possibility that the area of the finger corresponding thereto is reflected darkly. Accordingly, the expansion angle of the light source, or the direction of an individual light source if the apparatus is constituted with a plurality of light sources, is adjusted so that the light will be expanded in a wide-angle manner and will reach the camera's position side as well, and thereby the devise is made so that the finger will be illuminated without unevenness.

Incidentally, in the foregoing description, the explanation has been given concerning the scheme where the two sets of the cameras and the light sources are provided. However, as is the case with the authentication apparatus illustrated in FIG. 1, the employment of only one set of cameras and light source is possible. In this case, two types of patterns in the case where the finger is held over the authentication apparatus from above and the case where the finger is held over the authentication apparatus from below are acquired, then these two types of patterns are registered as a pair. Furthermore, if either of the two types of registration patterns coincides with the pattern acquired at the authentication, it is judged that the finger is exactly the registered finger of the registered person. Otherwise, it is possible that two sets of cameras and light sources are disposed only in an apparatus to be used for the registration, while at the authentication, an apparatus is used in which only one set of cameras and light sources is provided. In comparison with the scheme where the two-set type apparatus is provided for all cases, this scheme makes it possible to decrease the user's burden of having to register the two-surface patterns by replacing the finger, while reducing the cost as an entire system including the registration and the authentication.

The above-described concept of making the specifications of the different apparatus at the registration and the apparatus at the authentication is also applicable to other aspects. For example, in the apparatus at the registration, a wider range of vein pattern than the range imaged at the authentication is imaged in advance, and registered as a registration pattern, and thereby implementation of the correct authentication becomes possible even if some extent of position shift exists at the authentication. When implementing the small-size authentication apparatus just like the present invention, the imaging range is very likely to unavoidably become narrower, and a small position shift appears remarkably as a difference in the vein pattern. If a comparison is made between the photographed image where the entire finger is selected as the target range and the photographed image where only the fingertip is selected as the target range, this remarkable appearance of the position shift is obvious from the relative ratio between the shifts when the finger is moved by the same length. The shift which will occur when the user places the finger is not so much concerned with a difference in the imaging target range, so that the narrower the imaging target range becomes, the more remarkable the problem of position shift becomes. Incidentally, when imaging a wide range, the apparatus also becomes relatively large. However, overall effective utilization of space becomes impossible by limiting the apparatus to only one apparatus to be used for the registration, and disposing the only one apparatus at a location where space has a comparatively large degree of freedom, and also by using a small-size apparatus as the apparatus to be used for ordinary operations. The wide-range pattern at the registration may be used as a piece of large registration pattern, or is allowed to be managed in a unified manner by dividing into a plurality of smaller registration patterns for each part and treating as a set. In the latter case, if the size of the divided pattern is caused to be the same size as the pattern acquired by the authentication-use small-size apparatus, the smaller registration patterns can be registered by the small-size apparatus as well, and also, it becomes possible to accomplish a compatibility with the registration pattern acquired by the registration-specific apparatus. This allows accomplishment of hierarchical registration operation and management where the registration is easily executable by the small-size apparatus as well and the higher-accuracy registration is executable by the dedicated registration apparatus.

Also, the above-described mode of the fingertip guidance jigs is also applicable to the optical arrangement in the conventional finger-vein authentication apparatuses. In the conventional scheme, in order to image the ball side of the finger, the camera is disposed directly under the ball side. In the case of this imaging mode, between the case where the finger is placed from above and the case where the finger is placed from below, the acquired vein patterns merely differ from each other in their directions by 180°. Consequently, it is required only to have one type of the registration patterns. At the authentication, a one-time comparison is made between the acquired pattern and the registration pattern, and if these patterns do not coincide with each other, a comparison is made once again between the pattern acquired by being rotated and the registration pattern. If the patterns coincide with each other in either of these two-times comparisons, the personal identification can be regarded as being successfully accomplished.

In the above-described authentication apparatus illustrated in FIG. 1 or FIG. 4, and in particular, in the above-described authentication apparatus where the vein pattern of the side surface of the finger is used as the imaging target by adopting the oblique arrangement of the camera and the light source, the outside-appearing part and the embedded part share their own set-up spaces in small amounts, respectively. This makes it possible to utilize the space in a well-balanced manner. Simultaneously, since the components needed for the authentication are integrally configured, the authentication apparatus is preferable when installed into some type of larger apparatus or system. For example, when the authentication apparatus is set up on a door, installing the authentication apparatus into a door handle permits the authentication to be installed into a handle-holding operation, which is the operation naturally performed in a door-opening operation. Accordingly, there exists an effect of being capable of making the operation simple and easy. The door handle, however, is limited in its thickness so that humans feel it easy to hold the door handle. Since, in the scheme of the present invention, the part to be embedded is so configured as not to become too large-sized, its installment is easy to perform. Furthermore, the authentication apparatus can be provided integrally as a part of the apparatus without devising an irrational configuration that, e.g., the light source and the camera are separated, and are disposed on the handle side and the door side respectively so that they will be able to be installed in a small target. This is advantageous in such aspects as the fabrication or maintenance.

Figure 8:
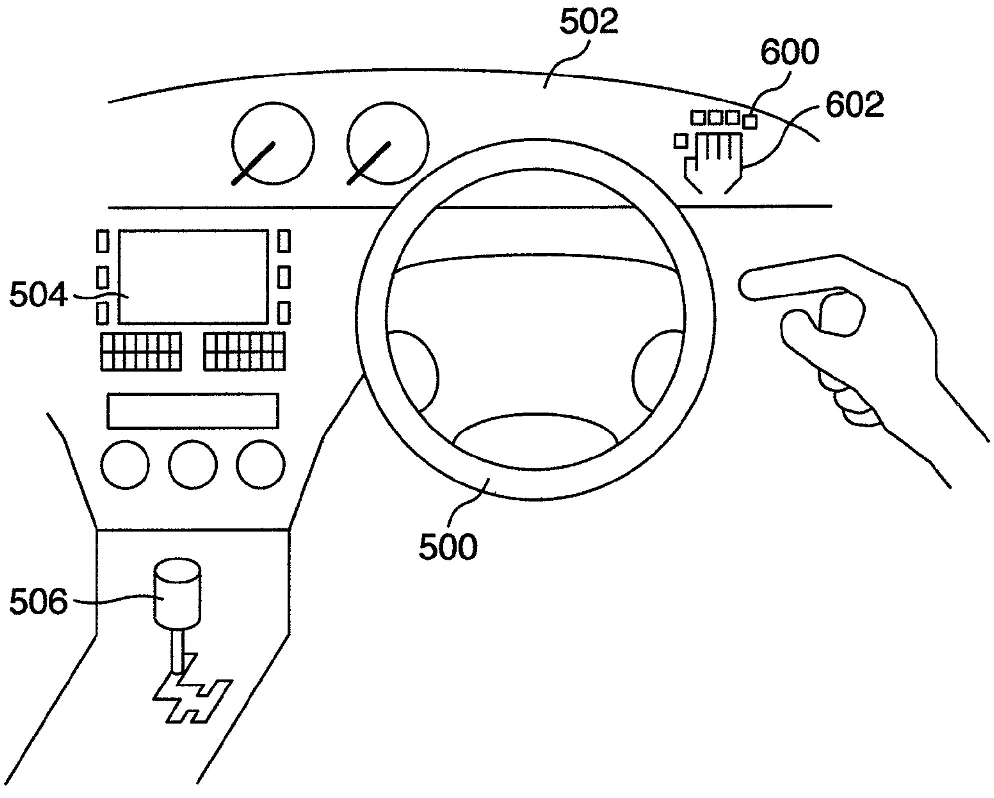
FIG. 8 is an example of the instrument panel of an automobile.

FIG. 8 illustrates an example where the authentication apparatus of the present invention is applied to an automobile. The present diagram is a schematic one for illustrating the periphery of an instrument panel of the automobile, on which appliances are disposed, such as a steering wheel 500, instruments 502 such as a speed meter, and a car navigation system 504. Here, if the authentication apparatus can be installed into the steering wheel 500 which is certain to be held without fail at the time of the driving, the operability can be enhanced tremendously. Specifically, merely holding the steering wheel 500 makes it possible to automatically judge who is the person taken the driving seat, and to permit the person to start the engine. Simultaneously, merely holding the steering wheel 500 makes it possible to optimize settings for seat position, air conditioner temperature, audio, and the car navigation so that these settings will be most fitted to the person.

Figure 9:
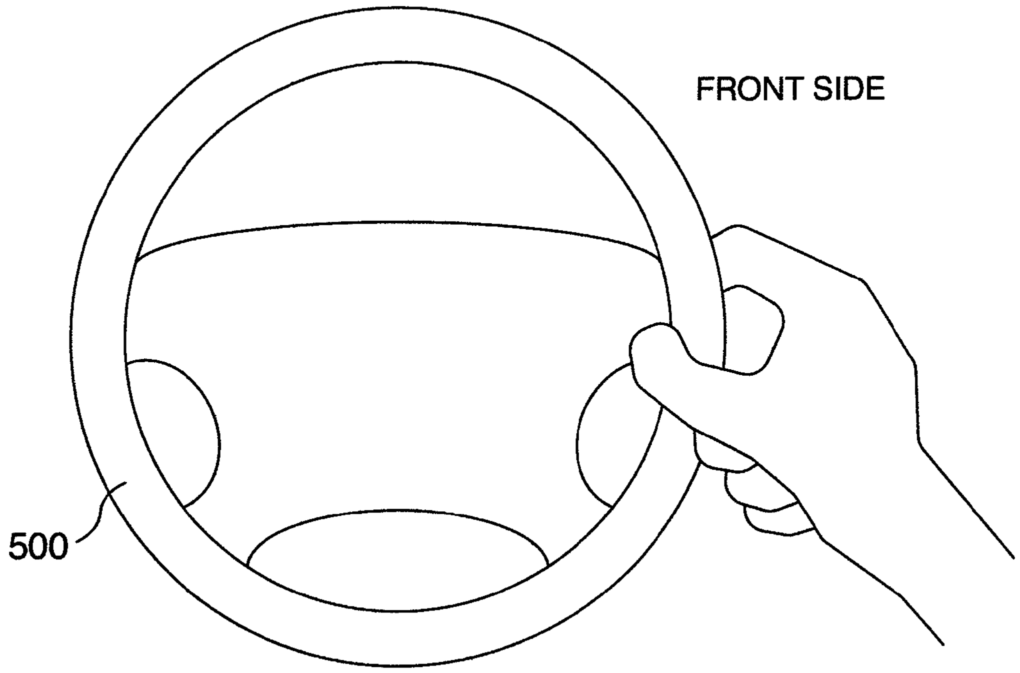
FIG. 9 is an example of the steering equipped with an apparatus embodiment of the present invention.
Figure 10:
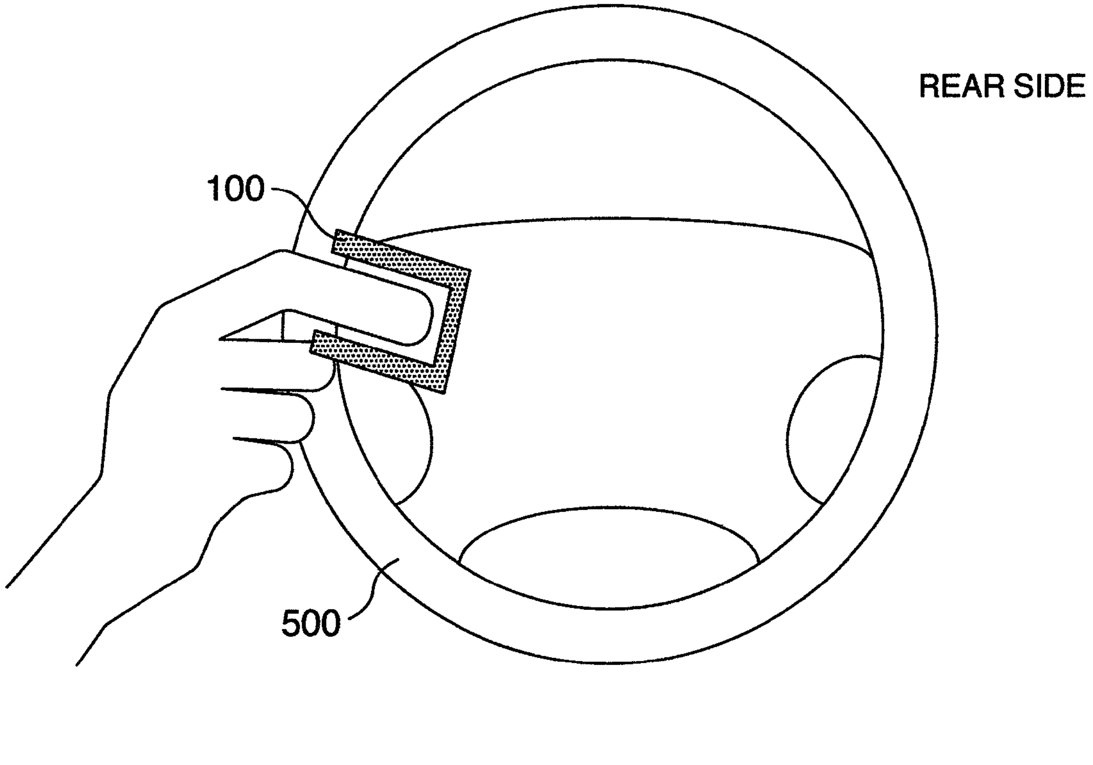
FIG. 10 is an example of the state as FIG. 9 is seen from the rear side.

FIG. 9 and FIG. 10 are diagrams for schematically illustrating the state of the hand at the time of holding the steering wheel 500 and performing the authentication. FIG. 9 is the front surface seen toward the instrument-panel side in FIG. 8, and FIG. 10 is the diagram where the state at that time is seen from the rear side of the steering wheel 500. The authentication apparatus is disposed at a spoke part on the rear side of the steering wheel 500. Here, deploying the authentication apparatus not at a ring part but at the spoke part means a consideration from the safety's point-of-view. This consideration refers to a possibility that, e.g., if the protrusion exists on the ring part, there is a danger that the driver's fingers may be snagged by the protrusion, or the driver can not operate as the driver intended. If the configuration and size of the protrusion fall within a range of no problem from the safety's point-of-view, the protrusion is allowed to be disposed on the ring part. Also, nowadays, the spoke part has a tendency to become thicker and thicker in terms of the structure, such that an air bag is mounted thereon. Consequently, there also exists an advantage that it is easy to ensure a space into which the apparatus and wirings are contained.

As illustrated in FIG. 10, at the time of holding the steering wheel 500, the user holds only one finger which had been registered for the authentication over the authentication apparatus. The only one finger may be the index finger, or may also be another finger as a matter of course. Once the authentication apparatus has confirmed that the finger is exactly the registered finger of the very person registered, an immobilizer is released, which allows the engine to be started. Otherwise, the settings for the seat position and air conditioner which the person registered had set at the time of previous ride are memorized, and even if the settings have been changed by another person's riding on the automobile, the very person restores the settings back to his or her previous settings.

If the authentication apparatus of the present invention is set up onto a door handle of the automobile, it can be recognized at a point-in-time when the door is opened who has opened the door, so that settings similar to these personal settings are possible. In this case, from the stage of the lock release of the door, the registered person finds it possible to ride on the automobile even if the person does not have key at all. Moreover, time can be saved since, e.g., a setting modification intended for the registered person is performed while the door is opened. Since, in the apparatus of the present invention, the small-size implementation is accomplished by watching only the fingertip part, completely the same apparatus can be installed into both the door handle and the steering wheel. This feature makes it possible to make the registration pattern common thereto, thereby allowing basically the same authentication to be made based on the one-time registration in both the door handle and the steering wheel. Also, it is possible to share the processing apparatus for making the authentication, which, in this case, is capable of serving for a cost reduction as the system as a whole. In the case of the automobile, it is convenient that the door lock can be released by even a minor or a person with no diving license. From the safety's point-of-view, however, it is preferable that such persons other than persons having diving-qualification are prohibited from performing the driving-concerned operations. By setting up the authentication apparatus at the two locations in this way, it becomes possible to implement the following operation: Namely, a person having no driving qualification is requested and permitted to just open the door of the automobile anyway. After that, the person rides on the driving seat without making the authentication once again at the door, then making the authentication by the authentication apparatus of the steering wheel. In this way, the person shifts the automobile into a state of allowing starting of the engine or driving of the automobile. On this occasion, it is more advantageous, in some cases, to perform the personal settings, such as displacement of the seat position, after the authentication at the steering wheel has been completed. Also, by setting up the authentication apparatus at the two locations, it also becomes possible to implement an operation such that, e.g., the judgment criterion on the authentication when opening the door is relaxed, whereas the condition on the authentication concerning engine-starting at the steering wheel is made severer. This is because the door handle is positioned at an external circumstance, and thus has a possibility that the authentication becomes difficult to make due to a variety of fluctuation factors there. Otherwise, conversely, the following operation is also executable: Namely, in a case where a pattern which was registered by a person who had successfully made the authentication at the door handle at one time does not satisfy the coincidence condition with a pattern which is requested in the authentication at the steering wheel, if it is found to be close enough thereto, it is made possible to address a rough manner of the finger's placement by relaxing the judgment criterion, since the authentication had been successfully made at one time.

Also, the installment of the authentication apparatus into the steering wheel is preferable for a case where the personal identification is needed to be performed again during the driving. For example, in many cases, it is more advantageous that an ETC system for expressway-fee-payment/reception is usually set not to be used for crime prevention. It is possible, however, that the personal identification is made just before a tollgate during the driving to make the ETC effective and then the ETC is made ineffective immediately after that. Similarly, the authentication apparatus is usable as an accurate personal identification unit for the settlement in the case of shopping at a driving through or the like, or at the time of purchasing via communications such goods as music data or updated data for a car-navigation map.

Furthermore, the authentication apparatus of the present invention is used not only for the personal authentication, but also as button switches for calling for a variety of functions. When the button switches are disposed on the rear side of the handle usually, the driver cannot visually confirm what functions the button switches represent. Accordingly, only one single-function button switch can be disposed at one and the same location at most. In the finger-vein authentication, the patterns are completely different from each other for each finger even in the case of the same person. As a result, the authentication apparatus detects not the registered person, but the registered finger. The authentication apparatus permits the finger to be gropingly placed on a predetermined position by taking advantage of the above-described guidance jigs even if the authentication apparatus cannot be visually recognized, and this feature is basically the same for every finger. Then, a function is set up which makes it possible to freely call for functions in accordance with the requirements of an individual person after the authentication has been finished, the functions are, for example, the index finger calls for the immobilizer's release, the middle finger calls for the settlement's acknowledgement, and the ring finger calls for the music's reproduction. The set-up of this function allows a variety of functions to be easily called for by merely changing the fingers. When the plurality of button switches are arranged in a location incapable of visual recognition, the set-up of this function allows an arrangement capable of making an effective use of a location which is highly likely to be regarded as a dead space in the conventional concept, but has a good locational condition and easy to reach by hand. An example of such a location is the rear side of the steering, which was not usable because the button switches are highly likely to press in a mistaken manner. Also, a picture 602 of a hand and an icon 600 for indicating to which button switch what function is allocated in a simplified and symbolic manner are displayed on the part of instruments 502 illustrated in FIG. 8. This permits the driver to remember the allocation instantaneously if the driver forgets the allocation. Also, by making authentications by an identical finger in plural times in a short while instead of making the authentications by changing the fingers, it becomes possible to implement an operation corresponding to the double-click operation used in the graphical user interface of personal computers. In that case, additional different functions can be allocated. Otherwise, the further different functions can also be allocated by continuous authentications by the plurality of fingers in a short time-period. This allows even more functions to be called for by using only the fingers.

Incidentally, when the authentication apparatus is used as the button switches, the authentication accuracy may be relaxed. For example, the following authentication-accuracy relaxation is allowable: The pattern is judged to coincide with a pattern which is judged to be the closest of the registered patterns, then calling for a function which is allocated to the finger corresponding to the pattern.

Incidentally, in the foregoing description, the explanation has been given concerning the conveniences obtained by setting up the authentication apparatus of the present invention onto such appliances as the steering wheel and the shift knob. The present invention, however, is not limited thereto. It is needless to say that the authentication apparatus may be set up wherever, e.g., a lever for operating a winker or wiper, and an arm rest inside the door.

Figure 11:
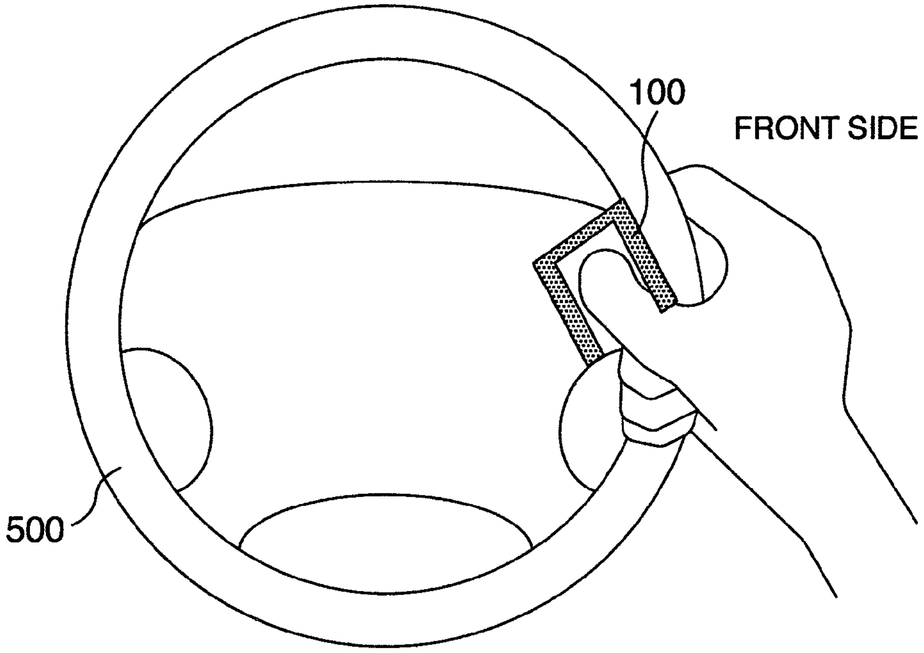
FIG. 11 is a second example of the steering equipped with the apparatus embodiment of the present invention.

For example, as illustrated in FIG. 11, it is also allowable to set up the authentication apparatus 100 on the front side of the steering wheel. In this case, the best operability is made available by disposing the authentication apparatus obliquely on the front side of the spoke part which is proximate to a connection part with the ring part. This is because, in this deployment, the thumb is exactly easy to place when the driver holds the steering wheel. At this time, the authentication apparatus is confirmable enough with visual recognition. It is possible to arrange a plurality of ordinary buttons at that position and, actually, such an embodiment exists. However, it is advantageous that displacement of the sight line of the driver during the driving is made as little as possible. Accordingly, the replacement of the same function by the gropingly operable buttons calling for multi-functions exhibits sufficient effect from the safety's point-of-view. Meanwhile, in FIG. 11, the ring part of the steering wheel is firmly held by the fingers other than the authentication-used finger in the same hand. This uniquely determines the position and rotation angle of the finger at the authentication, thereby causing an effect of stabilizing the authentication. Moreover, the position of the finger can be further stabilized by providing depressions continuously on this ring part which will match the arrangement of the fingers. This manner of the finger's folding the steering wheel is also applicable similarly to the earlier-described cases of the embodiments illustrated in FIG. 9 and FIG. 10. This is also an advantage obtained by setting up the authentication apparatus at the above-described position.

Figure 12:
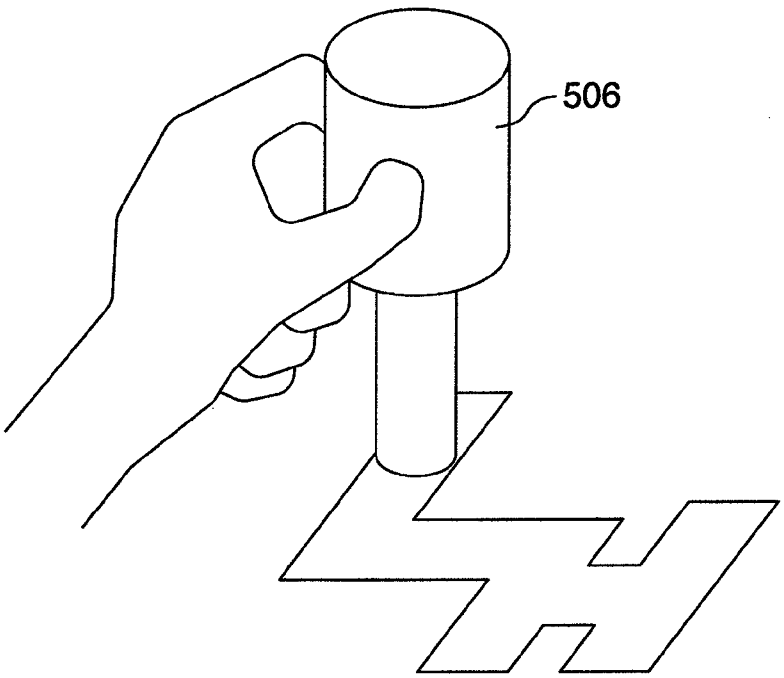
FIG. 12 is an example of the transmission lever equipped with the apparatus embodiment of the present invention.

Also, as illustrated in FIG. 12, it is also allowable to set up the authentication apparatus at the grip part of a transmission shift lever. In this case, it is advantageous to set up the authentication apparatus at a position which the fingertip will naturally reach when the driver grips the lever. Consequently, an excellent operability will be available by setting up the authentication apparatus as follows: If the lever grip is on the large side, the apparatus is set up on the instrument-panel-side surface of the lever grip, whereas, if the lever grip is on the small side, the apparatus is set up at a position on the driver's-seat side which the finger will reach via turning around the lever from an assistant-driver's-seat side.

Incidentally, in the above-described embodiment, the explanation has been given in the case of right-hand-drive automobile as its example. The present invention, however, is also applicable to a left-hand-drive automobile similarly. In this case, a symmetrical arrangement is also employable optionally.

It can be expected that the present invention will be applied to every field in which keys and personal identification numbers have been conventionally used.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A finger-vein authentication apparatus for identifying an individual person by using a vein pattern of a finger, said finger-vein authentication apparatus comprising:

a set plane on which a finger is placed;

a light source for illuminating one surface of both side-surfaces of a fingertip of said finger with light; and an imaging unit for imaging the other surface of said fingertip, said light source and said imaging unit being positioned at both sides of said set plane;

wherein a light-shielding means is provided on a light-source side of a position facing said finger placed on said set plane, said light-shielding means being used for shielding said illumination light such that said illumination light does not travel to a ball side of said finger; and an empty clearance is provided at a position under said finger on an imaging plane side such that said finger on said imaging plane side is prevented from touching said set plane.

2. The finger-vein authentication apparatus according to claim 1, wherein said side surface of said finger to be imaged is a range covering from said fingertip of said finger to a first joint thereof.

3. The finger-vein authentication apparatus according to claim 1, wherein said finger-vein authentication apparatus is mounted onto a steering wheel of an automobile.

4. The finger-vein authentication apparatus according to claim 3, wherein patterns of a plurality of fingers are registered in advance per individual person, and a function to be started up after said authentication is changed according as each finger.

5. The finger-vein authentication apparatus according to claim 1, wherein said finger-vein authentication apparatus is mounted onto a transmission lever of an automobile.

* * * * *